United States Patent
Thouret (10) Patent No.: US 9,315,249 B2
(45) Date of Patent: *Apr. 19, 2016

(54) PROPULSION DEVICE FOR USE WITH A FLUID

(71) Applicant: Brice Thouret, Quebec (CA)

(72) Inventor: Brice Thouret, Quebec (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/336,576

(22) Filed: Jul. 21, 2014

(65) Prior Publication Data

US 2014/0328682 A1 Nov. 6, 2014

Related U.S. Application Data

(63) Continuation of application No. 13/715,505, filed on Dec. 14, 2012, now Pat. No. 8,784,148.

(51) Int. Cl.
*B63H 1/36* (2006.01)
*F16H 21/40* (2006.01)

(52) U.S. Cl.
CPC .............. *B63H 1/36* (2013.01); *F16H 21/40* (2013.01); *Y02E 10/28* (2013.01); *Y10T 74/18208* (2015.01)

(58) Field of Classification Search
USPC ........................................... 440/13–15
IPC ................................................. B63H 1/36,1/37
See application file for complete search history.

(56) References Cited

U.S. PATENT DOCUMENTS 1,003,516 A * 9/1911 Sax .................................. 440/15
3,695,211 A 10/1972 Gross
4,172,427 A 10/1979 Kindred
4,688,994 A 8/1987 Gongwer
4,969,846 A 11/1990 Sugimoto
5,401,196 A 3/1995 Triantafyllou et al.
6,835,108 B1 12/2004 Gieseke
6,877,692 B2 4/2005 Liu (Continued)

FOREIGN PATENT DOCUMENTS

EP          1 912 858 B1    10/2011
WO      WO-00/78606 A1    12/2000

(Continued)

OTHER PUBLICATIONS

"Notification of Transmittal of the International Search Report and the Written Opinion of the International Searching Authority, or the Declaration," International Filing Date: Dec. 13, 2013, International Application No. PCT/CA2013/050961, Applicant: Thouret, Brice, Date of Mailing: Feb. 27, 2014, pp. 1-8.

*Primary Examiner* — Stephen Avila
(74) *Attorney, Agent, or Firm* — Cesari and McKenna, LLP; James A. Blanchette (57) ABSTRACT

In one embodiment, a propulsion device for use with a fluid may include a shaft coupled to a drive system that rotates the shaft, one or more cranks rigidly coupled to the shaft, and one or more connecting structures that are movably coupled to one of the one or more cranks. A foil may be rigidly coupled to the one or more connecting structures. One or more slide structures or one or more linkages may be coupled to the foil and arranged to restrain movement of the foil when the foil is actuated by the one or more cranks via the one or more connecting structures, such that rotational motion of the shaft is translated to a combination of motion of the foil between an inner extent and an outer extent and motion of the foil within an angular range between first and second limits.

20 Claims, 11 Drawing Sheets

(56) References Cited

U.S. PATENT DOCUMENTS

| | | |
|---|---|---|
| 7,744,434 B2 | 6/2010 | Wu |
| 8,784,148 B2 * | 7/2014 | Thouret .......................... 440/13 |
| 2003/0216091 A1 | 11/2003 | Wang et al. |
| 2010/0285703 A1 | 11/2010 | Vermeiden |
| 2010/0291814 A1 | 11/2010 | Vermeiden |
| 2011/0028056 A1 | 2/2011 | Paish |
| 2013/0178117 A1 | 7/2013 | Baumann |
| 2014/0165750 A1 | 6/2014 | Thouret |

FOREIGN PATENT DOCUMENTS

| | | |
|---|---|---|
| WO | WO-2007/019552 A2 | 2/2007 |
| WO | WO 2011/115475 A2 | 9/2011 |
| WO | WO 2012/040834 A1 | 4/2012 |

* cited by examiner

PROPULSION DEVICE FOR USE WITH A FLUID

RELATED APPLICATIONS

This application is a continuation of U.S. application Ser. No. 13/715,505 filed on Dec. 14, 2012 by Brice Thouret for a "Propulsion Device for use with a Fluid", now issued as U.S. Pat. No. 8,784,148, the contents of which are incorporated by reference herein in their entirety.

BACKGROUND

1. Technical Field

The present disclosure relates to propulsion devices, and more specifically, to propulsion devices for use with a fluid.

2. Background

Propulsion devices (e.g., marine prolusion devices) may be employed to move objects (e.g., watercraft) through a fluid (e.g., water) by imparting momentum to the fluid, which causes an opposite force upon the object. While paddles and jet drives are is sometimes used in marine propulsion, the most common mode of marine propulsion is the propeller. A propeller converts rotational motion of a shaft to thrust in a propulsion direction. Basically, when in operation, a pressure difference arises between forward and rearward surfaces of blades of the propeller, and this pressure difference imparts rearward momentum on the fluid.

While propellers have a long record of reliable operation, they suffer a number of shortcomings as a propulsion device. Among other things, they are relatively dangerous. In order to impart sufficient momentum on the fluid (e.g., water), the blades of a propeller generally must rotate at a high rate. Should a human, or an animal (e.g., a fish), come in contact with the rapidly rotating blades, severe injury or death may occur. Further, should debris come in contact with the rapidly rotating blades, it may damage the blades, potentially causing them break off and be ejected. At the very least, the propeller may be fowled, and valuable time and effort may need to be expended to untangle the debris. For example, discarded line or marine vegetation may become entangled around a propeller, and dislodging the tangle may be time consuming and frustrating.

Further, propellers may be relatively inefficient. Even under ideal conditions, the efficiency of propellers is typically only in the range of 35-40%. Under less than ideal conditions (e.g., heavy loads, speed variations, etc.) and considering other drains (e.g., power distribution) the efficiencies of propellers generally falls in the range of 10% to 30%.

In efforts to achieve reasonable efficiency, propellers generally require a deep draft. Should a propeller be operated too near the surface, it may draw air into its blades, causing a loss of power and vibration. Sometimes the required draft is problematic, for example, if the propeller is intended to be used in a shallow area.

Still further, propellers are relatively noisy. This noise may be undesirable in is many different applications. For example, in propeller-driven pleasure craft, the noise may be disruptive to the passengers, who may be seeking a relaxing experience. Similarly, in fishing vessels, the noise may scare aquatic life.

To address the shortcomings of propellers, attempts have been made to employ oscillating foils in propulsion devices (e.g., marine propulsion devices). An oscillating foil propulsion system operates by moving one or more foils back and forth in the fluid, in a direction generally transverse to the direction of desired propulsion. The generally transverse movement of the foil, in combination with the changes in a pitch angle, impart at least some momentum to the fluid in a rearward direction, which causes the object (e.g., the watercraft) employing the oscillating foil propulsion device to be propelled forward.

However, existing oscillating foil propulsion devices have not achieved substantial adoption. While theoretically promising, they have suffered from a number of real world shortcomings. Generally, such oscillating foil propulsion devices have been exceedingly complex, for example, requiring complex mechanical systems and pitch regulating assemblies. This has led to substantial manufacturing costs, making them non-cost-competitive with propeller-driven propulsion alternatives. Further, many existing oscillating foil propulsion devices have been inefficient. While oscillating foils have the theoretical potential for high efficiency, existing devices have failed to achieve favorable efficiencies under real world conditions, and generally have had efficiencies lower than that of propellers in these circumstances. Still further, many oscillating foil propulsion devices have been structured so that most of the device was immersed in the fluid (e.g., water). As a result of this immersion, they have often required drafts roughly similar to that of propellers, negating a potential advantage.

What is needed is an improved propulsion device for use with a fluid that addresses some or all of the above discussed shortcomings.

SUMMARY

A propulsion device (e.g., a marine prolusion device) for use with a fluid (e.g., water) utilizes a crank-slider mechanism to move a flexible foil, back and forth in the fluid, in a direction substantially transverse to the direction of desired propulsion. In a first example embodiment, a shaft of the crank slider mechanism is driven by a dive system (e.g., a motor). The shaft is rigidly coupled to first and second cranks. The first and second cranks are movably coupled to first and second connecting rods, permitting rotation therebetween. The first and second connecting rods are rigidly coupled to a mast, having a bottom portion that extends into the fluid (e.g., water). The connecting rods may be coupled to the mast on opposing faces of a slide structure that has a channel formed therein. The mast extends through the channel. A stabilization rod may be rigidly coupled to the mast, and one of the connecting rods (for example, the second connecting rod). When the drive system engages, the first and second cranks, the first and second connecting rods, and the slide structure, may translate rotational motion of the shaft to a combination of substantially linear motion and rotational motion of the mast. The mast linearly oscillates between an inner extent and an outer extent, while rotating within an angular range between a first limit, through intermediate positions, to a second limit.

In the first example embodiment, a flexible foil may be rigidly coupled to the bottom portion of the mast, oriented such that the flexible foil is dispose substantially perpendicular to the first and second connecting rods. Such coupling will cause the flexible foil to be at a maximum inward pitch angle or a maximum outward pitch angle, while the mast is disposed at a midpoint between the inner and outer extents. The attachment point may be located between a leading edge and a trailing edge of the foil along its length. The flexible foil may be flexible through its length, with a nose portion and a tail portion having differing amounts of flexibility.

Such a propulsion device may be manufactured using low-cost manufacturing techniques. Due to the inherent rotation of the mast in this arrangement, the need for complicated pitch regulating assemblies may be obviated. Further, it may achieve favorable efficiencies under real world conditions. Still further, since a majority of the is propulsion device may be disposed above the surface of the fluid (e.g., water) it may accommodate a shallow draft.

It should be understood that a variety of other embodiments and implementations may utilize ones of the techniques and structures described herein. Several specific examples of alternative embodiments and implementations are discussed below. This Summary, is intended simply as an aid to the reader, and it should be understood that the invention is not limited to this one example embodiment.

BRIEF DESCRIPTION OF THE DRAWINGS

The description below refers to the accompanying drawings of example embodiments, of which.

DETAILED DESCRIPTION OF EXAMPLE EMBODIMENTS

Referring to FIGS. 1-5, in a first example embodiment 100 of a crank-slider mechanism and a flexible foil 105, the crank-slider mechanism includes a drive gear 110 that engages a gear (not shown) of a dive system (e.g., a motor). The drive gear 110 is rigidly coupled to a shaft 115, which is in turn is rigidly coupled to a first crank 120 and a second crank 125. The first crank 120 and the second crank 125 are movably coupled to a first connecting rod 130 and a second connecting rod 135, respectively, by a first crank bearing 145 and a second crank bearing 150 (not visible in some of the figures) that permit rotational motion. The first connecting rod 130 and the second connecting rod 135 are rigidly coupled to a mast 155, by a first connection 160 and a second connection 165. The connecting rods 130, 135 may be coupled to the mast 155 on opposing faces (top face 170 and bottom face 175) of a slide structure 180 that has a channel 185 formed therein. The mast 155 extends through the channel 185 of the slide structure 180. The connecting rods 130, 135 may be separated from the opposing faces 170, 175 by first and second collars 190, 195, respectively, that serve to stabilize the mast 155 within the channel 185. The first and second collars 190, 195 may be rigidly coupled to the mast 155. A further stabilization rod 140 may be rigidly coupled to the mast 155, and one of the connecting rods (for example, the second connecting rod 135). The stabilization rod 140 may serve to further stabilize the mast 155, and prevent flex.

Figure 1:
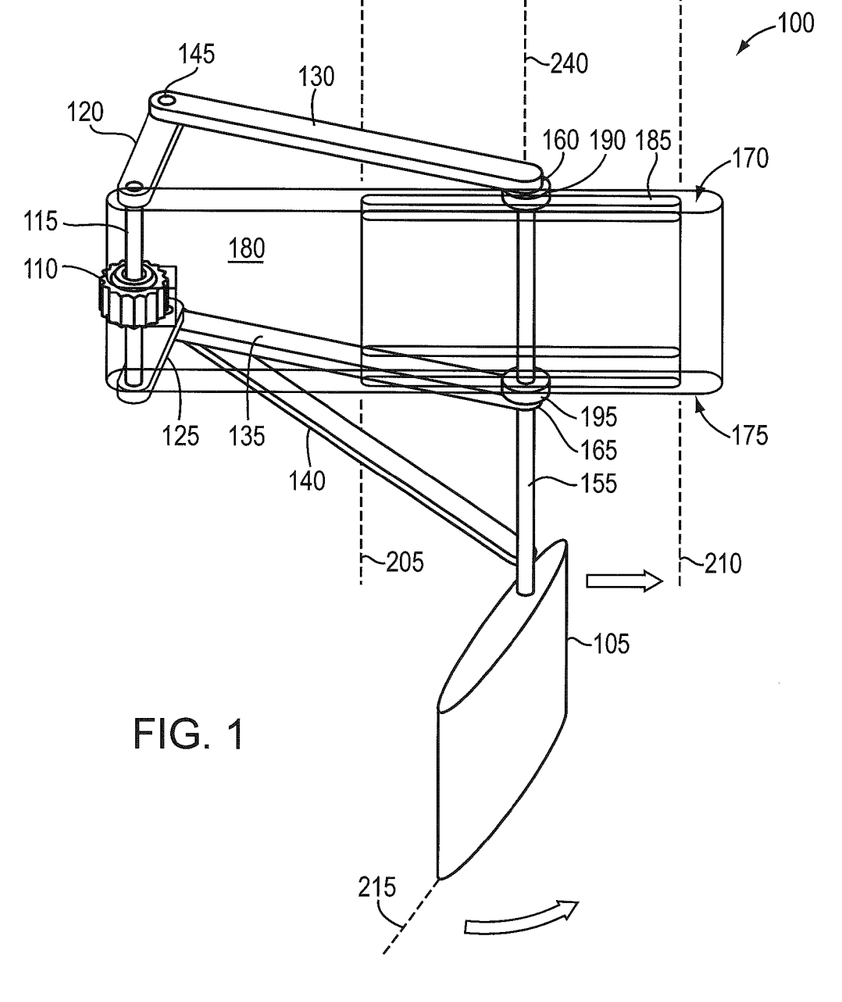
FIG. 1 is a perspective view of a first example embodiment of a crank-slider mechanism and a flexible foil, a slide shown in wire frame, a mast disposed at a midpoint of the slide as it travels linearly in an outward direction.
Figure 2:
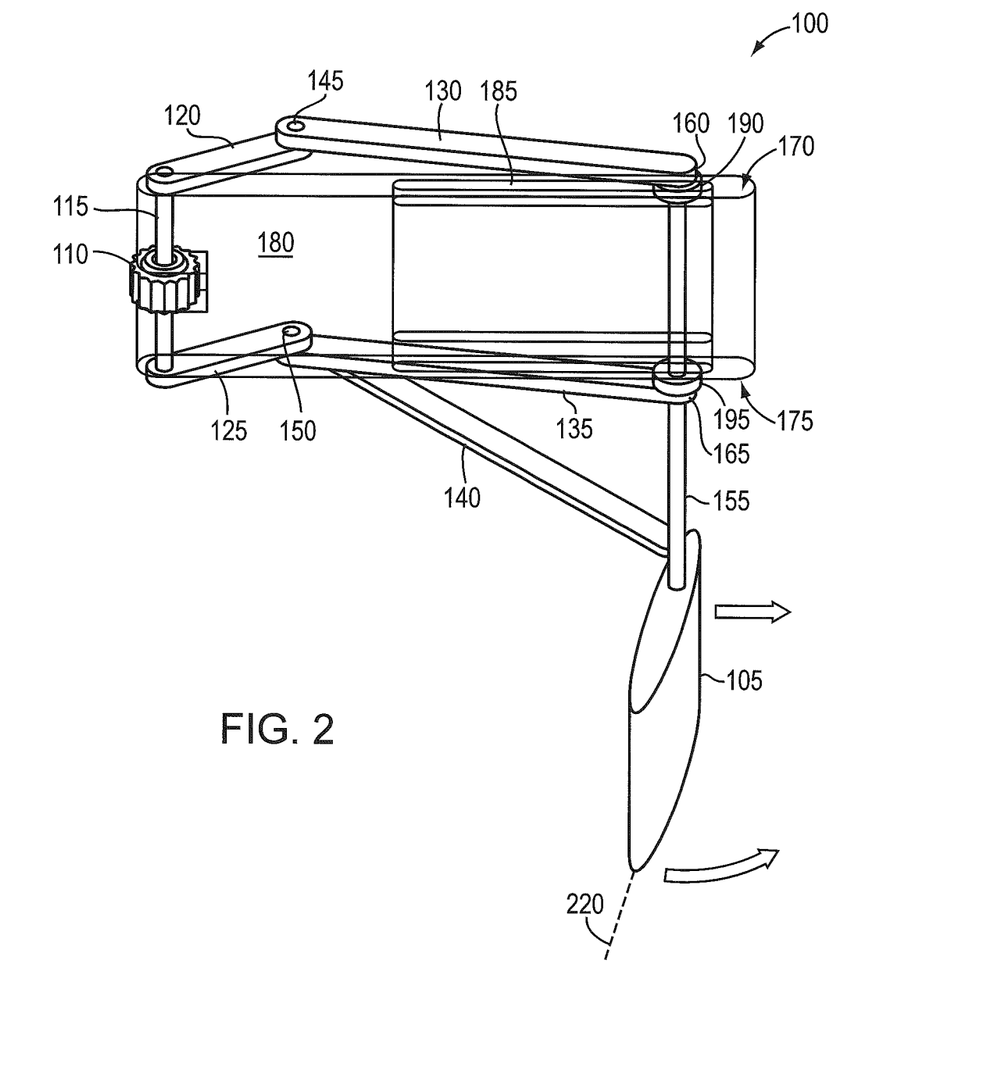
FIG. 2 is a perspective view of the first example embodiment of the crank-slider mechanism and the flexible foil, the slide shown in wire frame, the mast disposed proximate, but not quite at, its outer extent as it travels linearly in the outward direction.
Figure 3:
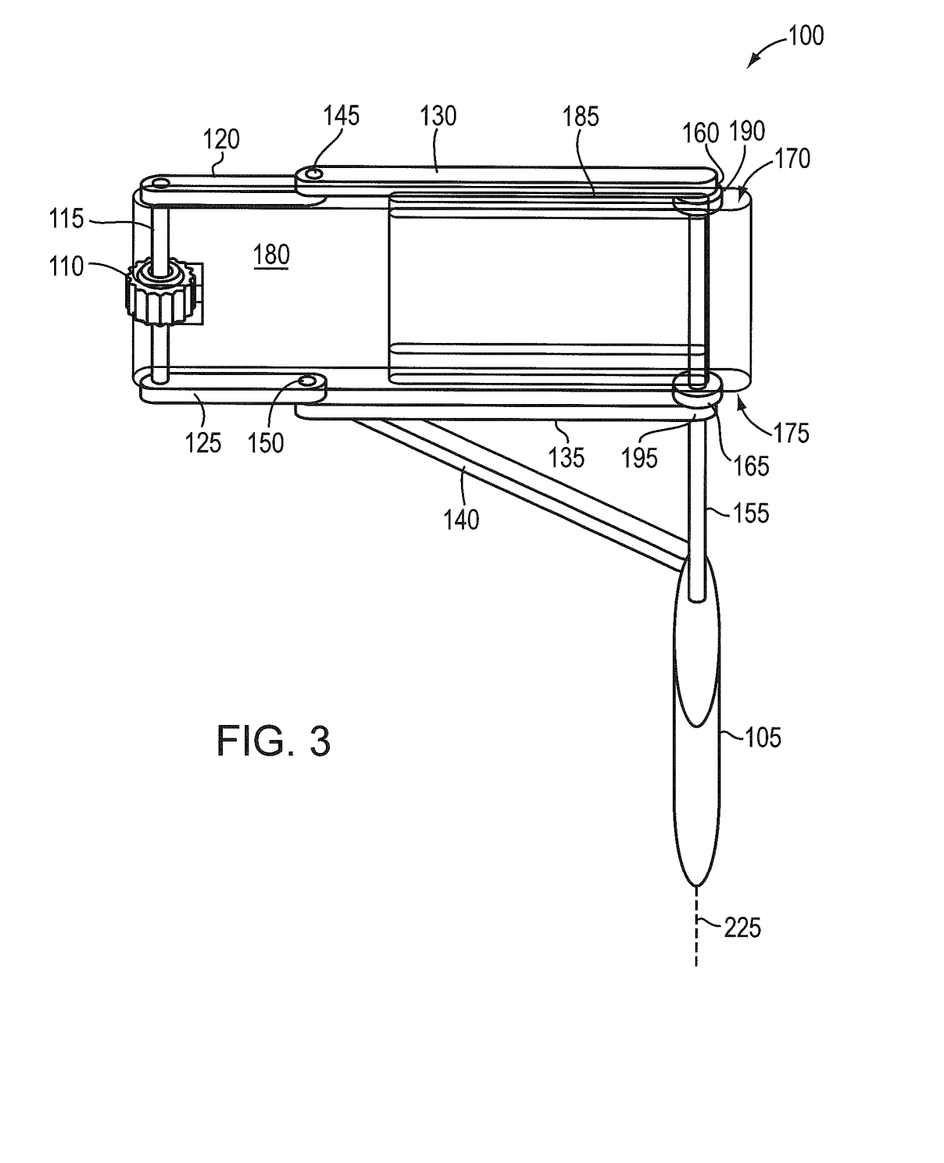
FIG. 3 is a perspective view of the first example embodiment of the crank-slider mechanism and the flexible foil, the slide shown in wire frame, the mast disposed at its outer extent in the slide.
Figure 4:
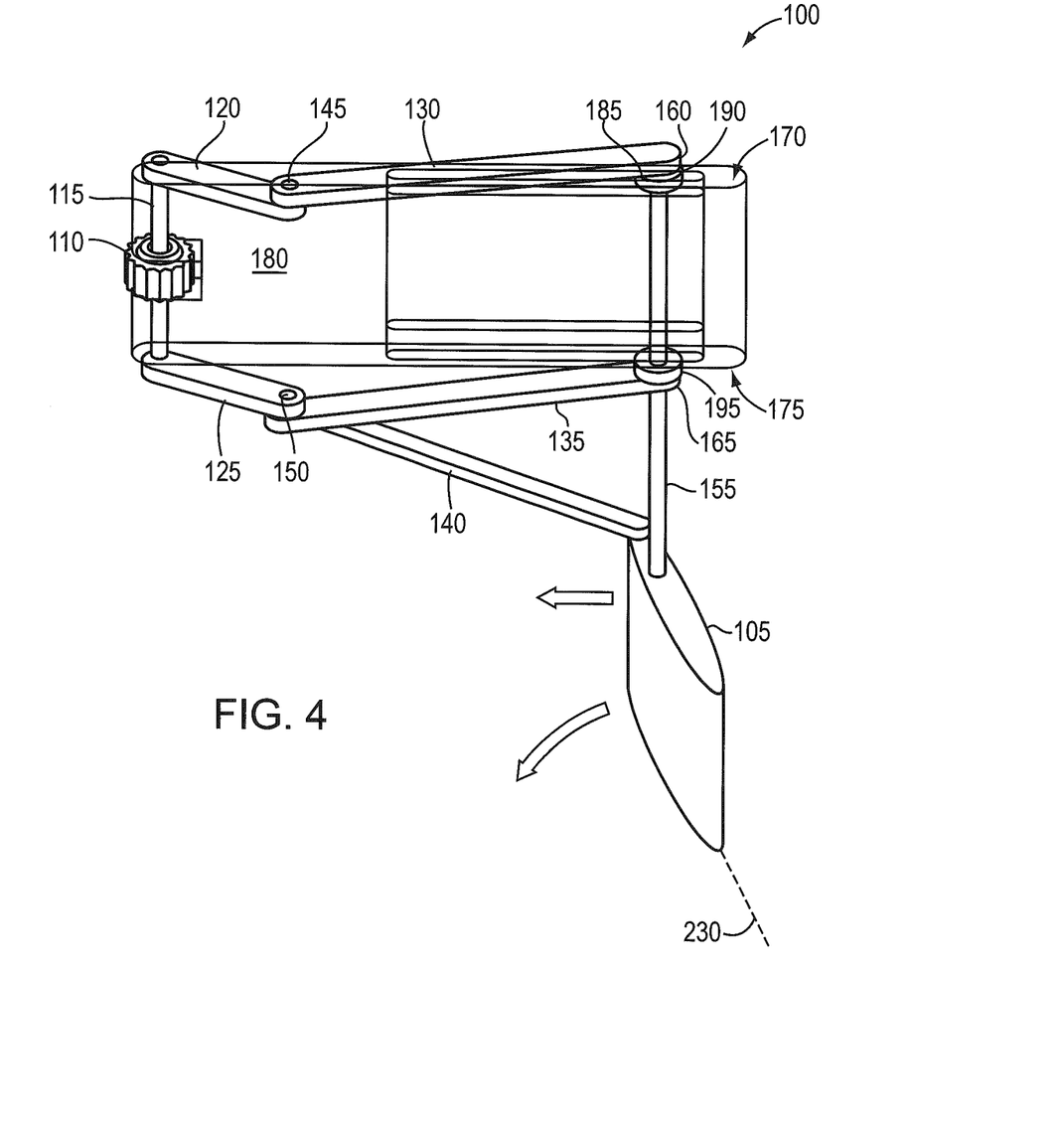
FIG. 4 is a perspective view of the first example embodiment of the crank-slider mechanism and the flexible foil, the slide shown in wire frame, the mast disposed proximate, but not quite at, its outer extent as it travels linearly in an inward direction.
Figure 5:
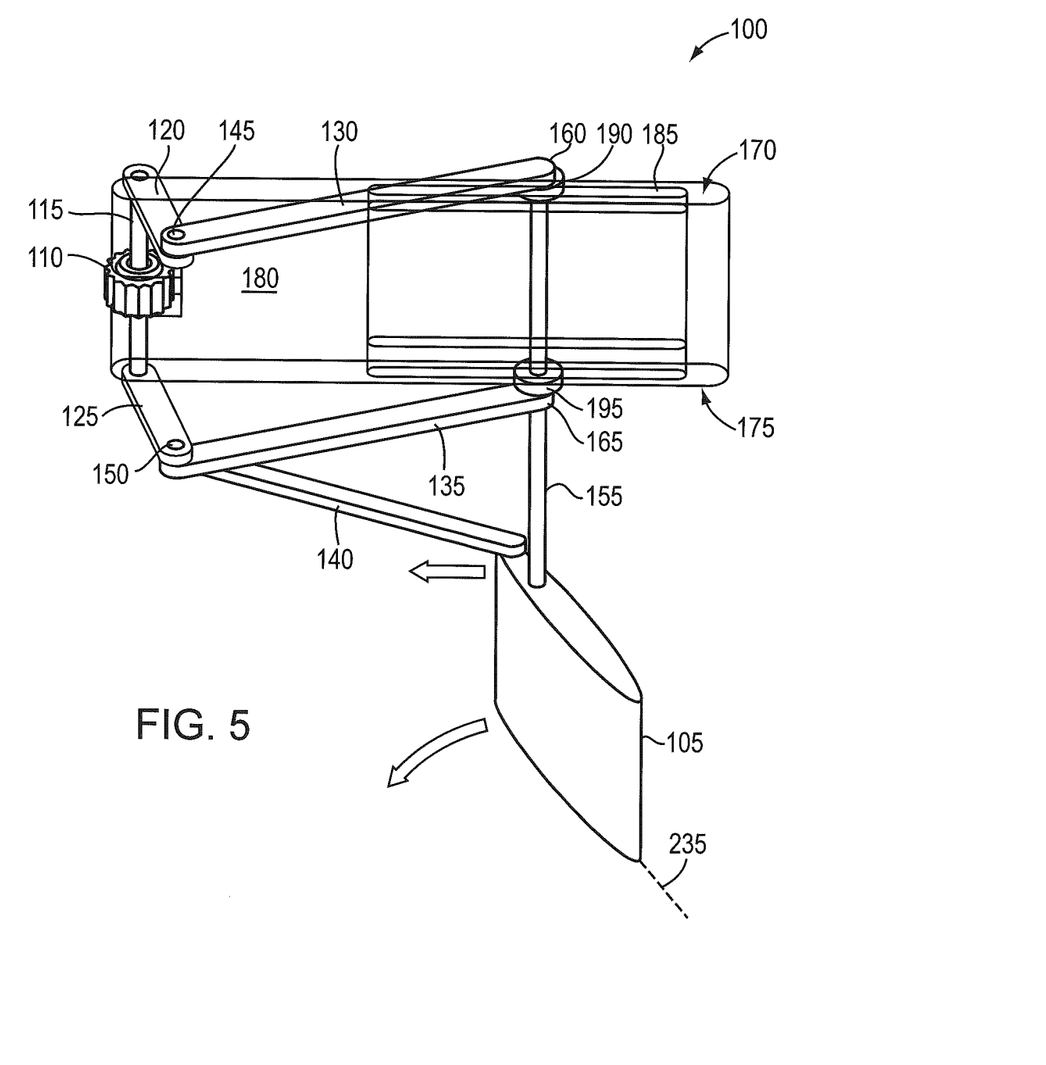
FIG. 5 is a perspective view of the first example embodiment of the crank-slider mechanism and the flexible foil, the slide shown in wire frame, the mast disposed at the midpoint of the slide as it travels linearly in the inward direction.

When the drive system (not shown) engages the gear 110, the cranks 120, 125, the connecting rods 130, 135, and the slide structure 180, translate rotational motion of the shaft 115 to a combination of linear motion and rotational motion for the mast 155. The mast 155 linearly oscillates between an inner extent 205 and an outer extent 210, while rotating within an angular range between a first limit 215 (see FIG. 1), through intermediate orientations 220-230 (FIGS. 2-4), to a second limit 235 (FIG. 5).

A flexible foil 105 may be rigidly coupled to the mast 155 at an attachment point along its length, oriented such that the flexible foil 105 is dispose substantially perpendicular to the first connecting rods 130 and the second connecting rod 135. Such coupling will cause the flexible foil 105 to be substantially perpendicular to the slide 180 when the mast 155 is at its inner extent 205 and its outer extent 210. It will further cause the flexible foil 105 to be at a maximum inward pitch angle or a maximum outward pitch angle, while the mast 155 is disposed at a midpoint 240 of the slide between the inner extent 205 and the outer extent 210 (the inward or outward direction of the pitch angle coinciding with the direction of the linear motion).

Figure 6:
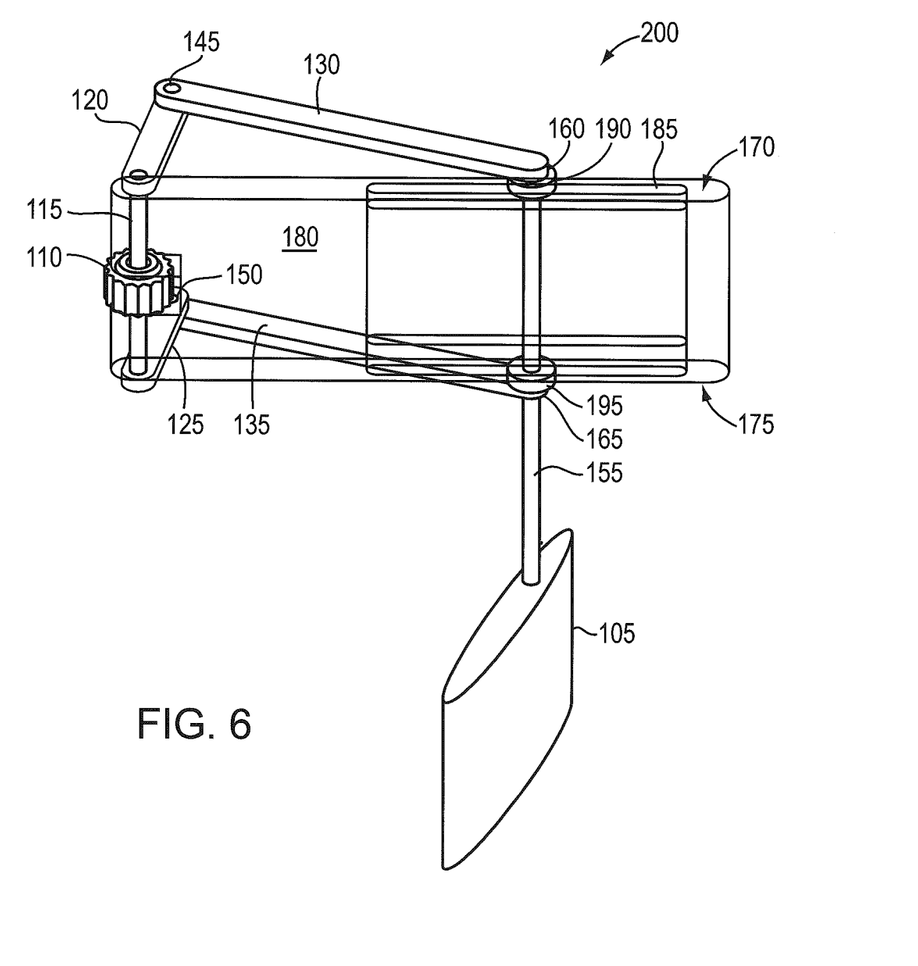
FIG. 6 is a perspective view of a second example embodiment of the crank-slider mechanism and the flexible foil, the slide shown in wire frame, the second example is embodiment lacking a stabilizer rod.

The crank-slider mechanism may be constructed in a variety of alternative manners. Referring to FIG. 6, in a second example embodiment 200 of the crank-slider mechanism, the crank-slider mechanism may lack a stabilization rod. Sufficient stabilization may be obtained from the remaining structure.

Figure 7:
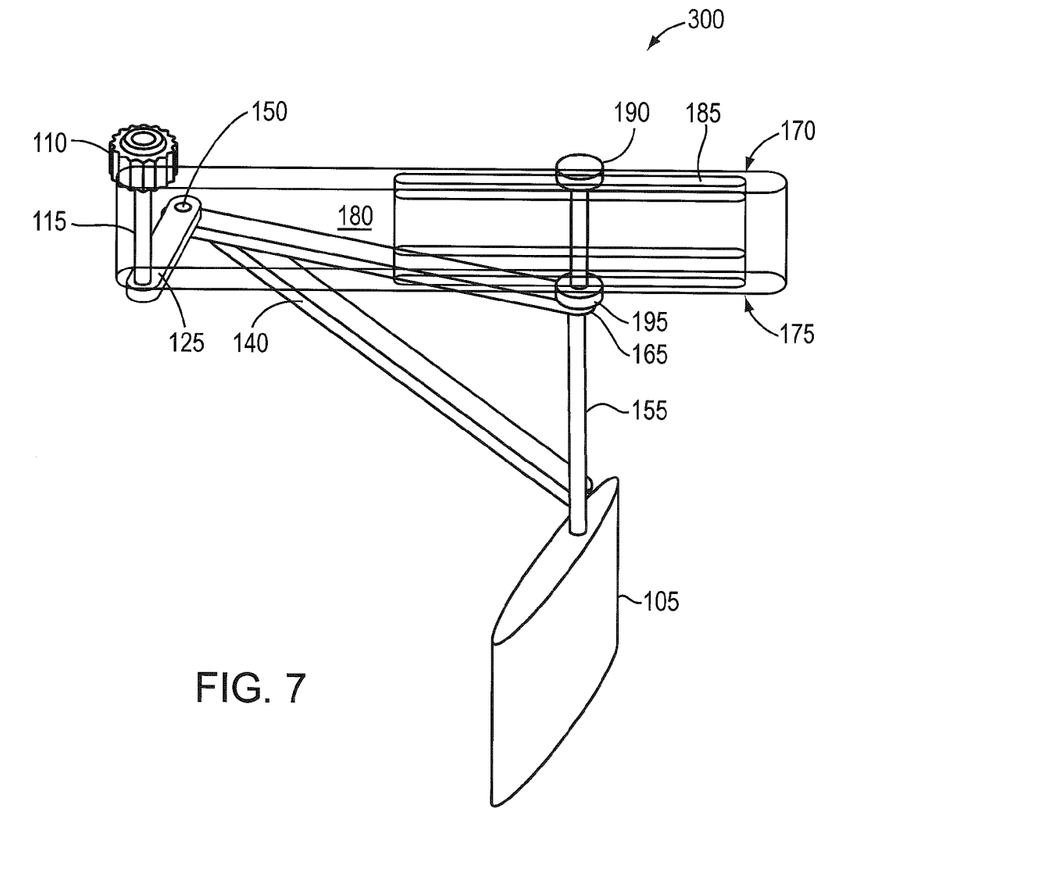
FIG. 7 is a perspective view of a third example embodiment of the crank-slider mechanism and the flexible foil, the slide shown in wire frame, the third example embodiment employing a single crank and connecting rod.

Referring to FIG. 7, in a third example embodiment 300 of the crank-slider mechanism, a single crank 125, connecting rod 135, and crank bearing 150 may be employed. While such an embodiment may be less robust than other embodiments, it may be sufficient for certain applications.

Figure 8:
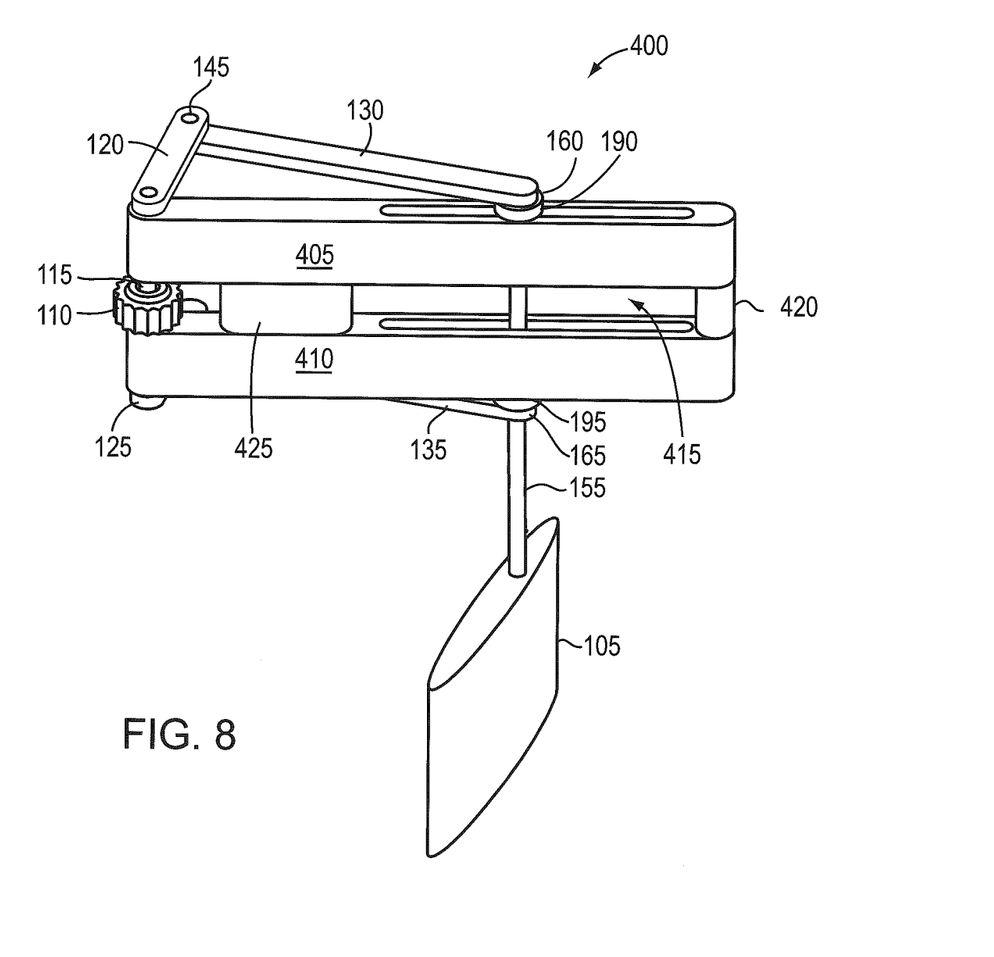
FIG. 8 is a perspective view of a fourth example embodiment of the crank-slider mechanism and the flexible foil, employing a multiple slides with a gap therebetween.

Referring to FIG. 8, in a fourth example embodiment 400 of the crank-slider mechanism, rather than a single slide, a first and second slides 405, 410 may be employed. The slides 405, 410 are separated by a gap 415 and joined by support structures 420, 425. The drive gear 110 may be disposed along the shaft 115 within the gap 415. Such an embodiment may lack a stabilization rod, or alternatively may employ one.

Figure 9:
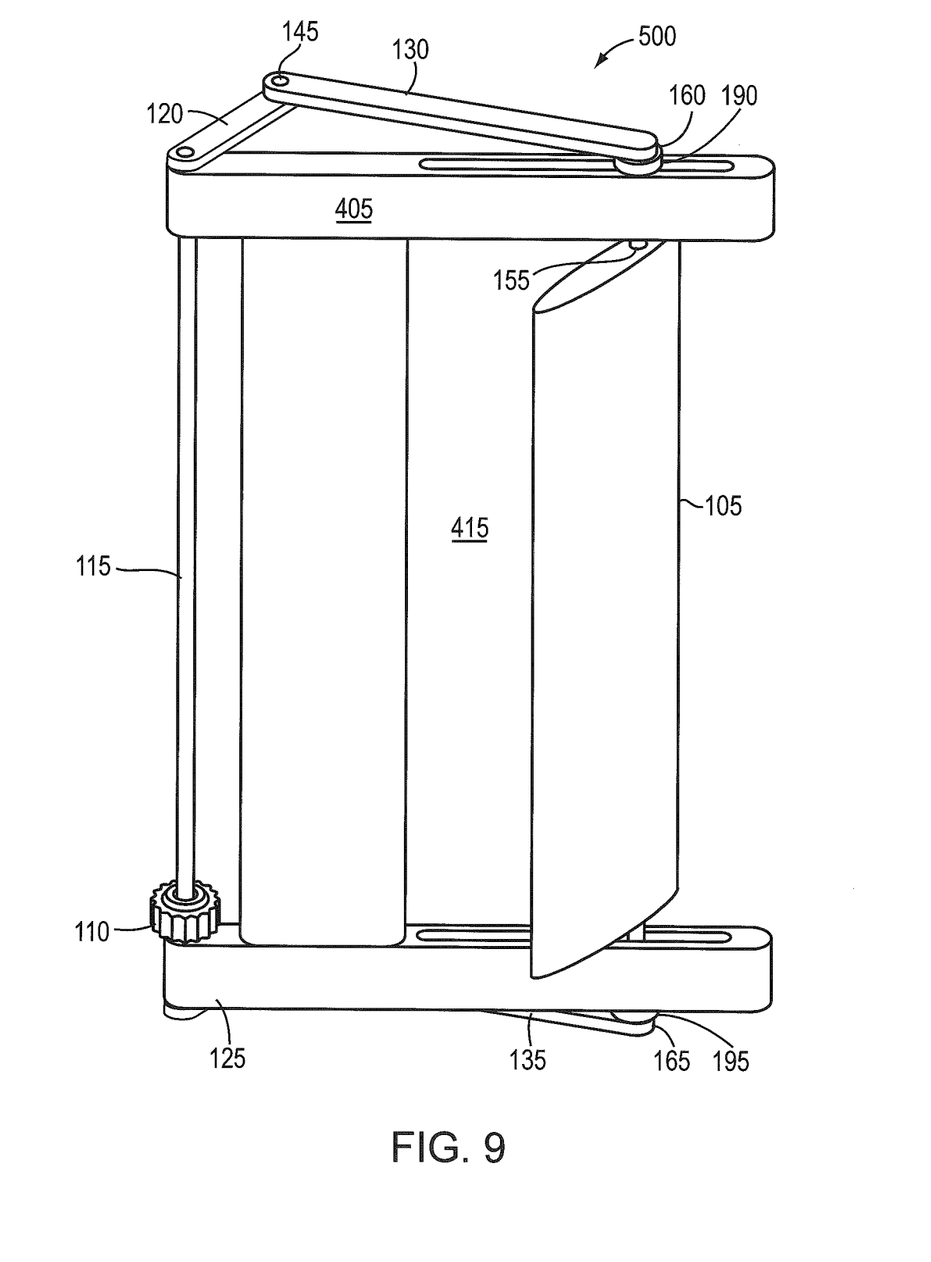
FIG. 9 is a perspective view of a fifth example embodiment of the crank-slider mechanism and the flexible foil, employing two slides with the flexible foil disposed therebetween.

Referring to FIG. 9, in a fifth example embodiment 500 of the crank-slider mechanism, the first slide 405 and the second slide 410 may be separated by a larger gap 415. The flexible foil 105 may be mounted along the mast 155 between the first slide 405 and the second slide 410, within the larger gap 415. In such implementations, the second crank 125 and connecting rod 135, the second slide 410, and a substantial portion of the mast 155 and support structure 425 may be immersed in the fluid (e.g., water). This arrangement may permit the use of much larger foils, while still maintaining structural rigidity. As discussed below, such larger foils may be suited for certain applications.

Figure 10:
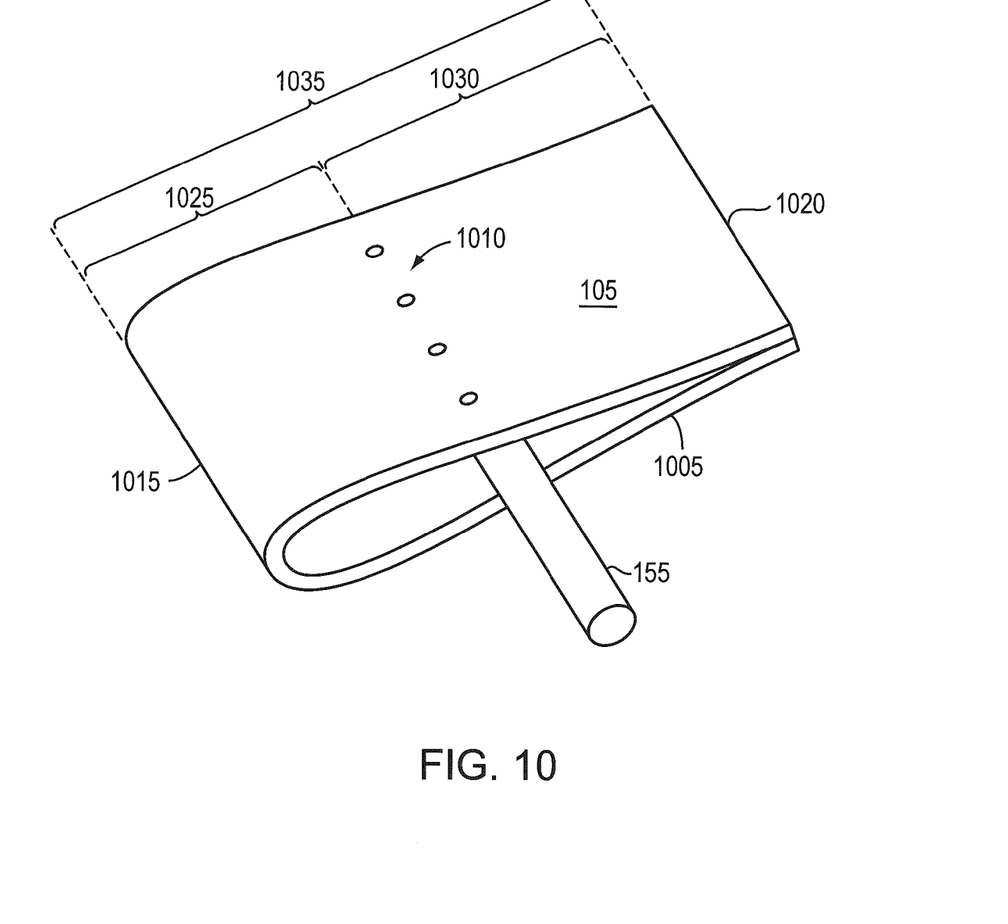
FIG. 10 is a perspective view of an example flexible foil made from a single sheet of material formed in a shape, geometry of shape providing differing amounts of flexibility in a nose portion and a tail portion of the flexible foil.
Figure 11A:
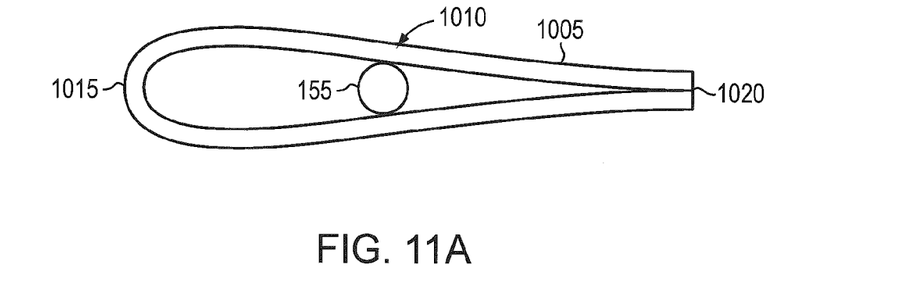
FIG. 11A is a top view of the example flexible foil made from the sheet of material.
Figure 11B:
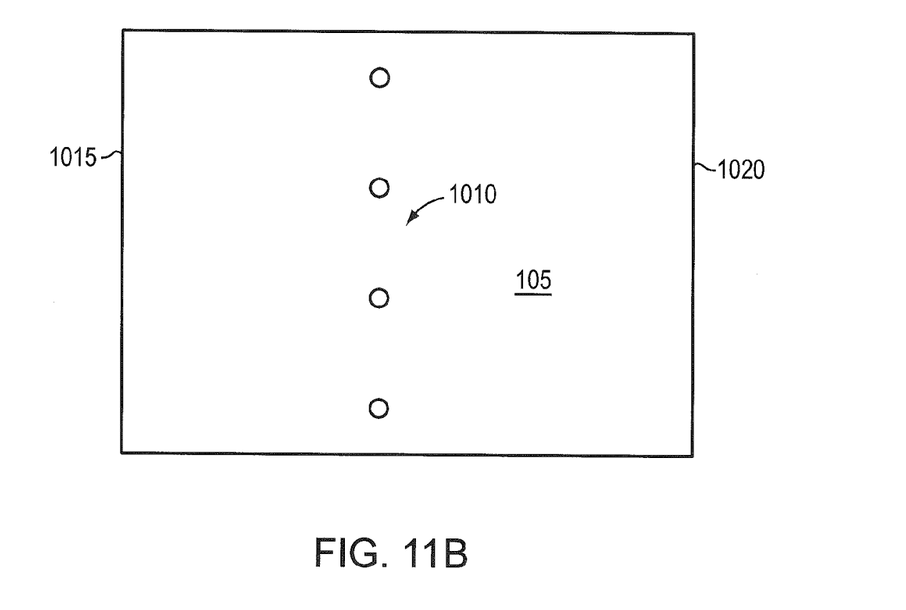
FIG. 11B is a side view of the example flexible foil made from the sheet of material

In each of the embodiments discussed above, the mast 155 is attached at an attachment point of the flexible foil. Referring to FIGS. 10-11B, in one implementation, the mast 155 is oriented such that the mast is parallel to a leading edge 1015 and a trailing edge 1020 of the flexible foil 105. The attachment point is located between the leading edge 1015 and the trailing edge 1020, such that the proportional length of a nose portion 1025 of the flexible foil (extending from the leading edge 1015 to the attachment point 1010) to an overall length 1035 of the foil (extending from the leading edge 1015 and the trailing edge 1020) is between 1:2 to 1:5, inclusive, or preferably between 1:3 to 1:4, inclusive.

The flexible foil 105 may have any of a variety of shapes. These shapes may be chosen based on hydrodynamics considerations, to promote flexibility, and/or for other reasons. In the example shown in FIGS. 10-11B, the flexible foil 105 is shaped such that its profile is substantially rectangular. Alternatively, the flexible foil may be shaped such that its profile resembles a delta, a fish-tail, or some other shape.

The flexible foil 105 may be flexible through its length (e.g., its overall length), with the nose portion 1025 and the tail portion 1030 having differing amounts of flexibility. For example, the flexibility may be graduated, such that nose portion 1025 is less flexible and the tail portion 1030 is more flexible. The flexibility may be produced in a variety of different manners. In one implementation, the flexible foil 105 may be made from a single piece of substantially flat flexible material (e.g., plastic), the flexible material formed into the shape of the flexible foil 105, where geometry of the shape provides the differing amounts of flexibility. The flexible material may be bent upon itself to form the leading edge 1015, and may meet upon itself to form the trailing edge 1020. The bent flexible material 1005 may be rigidly attached (e.g., with fasteners, adhesives, or some combination thereof) to the mast 155 at the attachment point 1010, the mast 155 extending between opposing faces of the bent flexible material 1005. The opposing faces of the bent flexible material 1005, while contacting at the trailing edge 1020, are preferable not rigidly attached to one another there. As such, the opposing faces may slide with respect to one another as the flexible foil 105 flexes back and forth, increasing flexibility of the tail portion 1030.

While the above description discusses various embodiments and implementations, it should be understood that a number of modifications and/or additions may be made without departing from the disclosure's intended spirit and scope.

It is discussed above that the crank-slider mechanism utilizes one or more slides 180, 405, 410 having channels formed therein to accommodate the mast 155. However, it should be understood that a straight-line linkage may be employed in place of the slide(s). While most straight-line linkages do not produce motion in an exactly straight line, they may approximate linear motion to an acceptable degree over a certain distance of travel. A variety of types of straight-link linkages may be employed. For instance, a four-bar linkage may be employed. One common four-bar linkage is the Watt's linkage. In a Watt's linkage, a chain of three rods is generally employed. Two longer equal length rods form the outside ends of the chain, and are movably coupled to a shorter rod that forms the middle portion of the chain. The outer endpoints of the longer rods are movably coupled to some structure, which allows them to rotate but maintains them fixed in space relative to each other. Between the two longer rods, the shorter rod, and the structure maintaining the endpoints, the linkage may be envisioned as a collection of four bars. In addition to a Watt's linkage, other four-bar linkages may be used, such as a Robert's linkage (sometimes referred to as a "W straight-line mechanism") or an Evan's linkage. Alternatively, a Chebyshev's linkage or Chebyshev's Lambda mechanism may be employed. Some of these alternatives may offer a better approximation of linear motion than a Watt's linkage. It should be understood that a wide variety of different linkages, and/or combinations thereof, may be employed in place of the slide(s), to achieve at least some of the advantages discussed herein.

Further, while it is discussed above that the techniques and structures may be used to propel an object (e.g., a watercraft) through a fluid (e.g., water), it should be understood that at least some of the techniques and structures may be adapted for use in a variety of other applications. For example, a version of a crank-slider mechanism with a flexible foil may be used in power generation. In such an alternative, the crank-slider mechanism may be rigidly fixed to a stationary support structure, and the flexible foil immersed in a moving stream of fluid (e.g., water). The moving stream of fluid may move the flexible foil, eventually causing rotation of the shaft, which may be used to drive a generator. Alternatively, a version of a crank-slider mechanism with a flexible foil may be used in a pumping application. In such an application, the crank-slider mechanism may be rigidly fixed to a stationary support structure, and the flexible foil immersed in a moving stream of fluid (e.g., water). The shaft may be driven by a drive system (e.g. a motor) to cause the foil to move fluid (e.g., water). The moved fluid (e.g., water) may be directed to a desired destination.

Further, while it is discussed above that the fluid may be water, it should be understood that the fluid may be any of a variety of other liquids. Also, in some alternatives, the fluid may be a gas (e.g., air). For example, an embodiment that employs a large foil, such as is shown in FIG. 9, may be used to move a gas (e.g., air), for example, to function as a fan.

Further, while it is discussed above that a drive gear coupled to the shaft may engage a drive system (e.g., a motor), it should be understood that a drive system may be coupled to the crank-slider mechanism in other manners. For example, the shaft may be directly coupled to the drive system, (e.g., a double shaft motor with each shaft directly coupled to a crank). Alternatively, in another example, one or more drive pulleys may be used.

Still further, it should be understood that the crank-slider mechanism and the flexible foil, or portions thereof, may be manufactured from a variety of different materials (e.g., metals, plastics, fiberglass, woods, and/or combinations thereof) using a variety of manufacturing techniques, including low-cost manufacturing techniques.

Accordingly, it should be understood that the above descriptions are meant to be taken only by way of example.

What is claimed is:
1. A propulsion device for use with a fluid, comprising:
a shaft coupled to a drive system that rotates the shaft;
one or more cranks rigidly coupled to the shaft;
one or more connecting structures that are movably coupled to at least one of the one or more cranks, the movable coupling to permit rotation therebetween;

a foil rigidly coupled to the one or more connecting structures, the foil actuated by the one or more cranks via the one or more connecting structures, the foil including
a nose portion extending between a leading edge of the foil and an area where at least one of the one or more connecting structures rigidly couple to the foil, and
a tail portion extending from an area where at least one of the one or more connecting structures rigidly couple to the foil and a trailing edge of the foil; and
one or more slide structures or one or more linkages that are coupled to the foil and arranged to restrain movement of the foil when the foil is actuated by the one or more cranks via the one or more connecting structures, such that rotational motion of the shaft is translated to a combination of motion of the foil between an inner extent and an outer extent and motion of the foil within an angular range between a first limit and a second limit.

2. The propulsion device of claim 1, wherein a pitch angle of the foil is at a maximum inward pitch angle or a maximum outward pitch angle with respect to a direction of propulsion when the foil is disposed at a midpoint between the inner extent and the outer extent.

3. The propulsion device of claim 2, wherein the pitch angle of the foil is controlled by interaction of the one or more cranks, the one or more connecting structures, and the one or more slide structures or one or more linkages.

4. A propulsion device for use with a fluid, comprising:
a shaft coupled to a drive system that rotates the shaft;
one or more cranks rigidly coupled to the shaft;
one or more connecting structures that are movably coupled to at least one of the one or more cranks, the movable coupling to permit rotation therebetween;
a foil rigidly coupled to the one or more connecting structures, the foil including
a nose portion extending between a leading edge of the foil and an area where at least one of the one or more connecting structures rigidly couple to the foil, and
a tail portion extending from an area where at least one of the one or more connecting structures rigidly couple to the foil and a trailing edge of the foil; and
one or more slide structures or one or more linkages that are coupled to the foil and arranged to restrain movement of the foil when the foil is actuated by the one or more cranks via the one or more connecting structures, such that rotational motion of the shaft is translated to a combination of motion of the foil between an inner extent and an outer extent and motion of the foil within an angular range between a first limit and a second limit,
wherein a pitch angle of the foil is controlled by interaction of the one or more cranks, the one or more connecting structures, and the one or more slide structures or one or more linkages to be at a maximum inward pitch angle or a maximum outward pitch angle with respect to a direction of propulsion when the foil is disposed at a midpoint between the inner extent and the outer extent, and the pitch angle of the foil is controlled absent a separate pitch regulating assembly.

5. The propulsion device of claim 1, wherein the one or more cranks comprise two cranks.

6. The propulsion device of claim 1, wherein the one or more connecting structures comprise two or more connecting rods.

7. The propulsion device of claim 1, wherein the one or more slide structures or one or more linkages are one or more linkages.

8. The propulsion device of claim 1, wherein the one or more slide structures or one or more linkages are one or more slide structures.

9. The propulsion device of claim 8, wherein the foil is rigidly coupled to the one or more connecting structures via a mast, the mast extending through a channel of the one or more slide structures, the channel restraining movement of the mast and thereby the foil.

10. The propulsion device of claim 9, wherein the one or more connecting structures is a connecting rod and the mast is rigidly coupled to the connecting rod.

11. The propulsion device of claim 9, wherein the mast is oriented parallel to the leading edge of the foil.

12. The propulsion device of claim 1, wherein the foil is a flexible foil that has graduated flexibility through a length of the flexible foil, the graduated flexibility providing a differing amount of flexibility between the tail portion and the nose portion.

13. A propulsion device for use with a fluid, comprising:
a shaft coupled to a drive system that rotates the shaft;
one or more cranks rigidly coupled to the shaft;
one or more connecting structures that are movably coupled to at least one of the one or more cranks, the movable coupling to permit rotation therebetween;
a foil rigidly coupled to the one or more connecting structures, the foil actuated by the one or more cranks via the one or more connecting structures, the foil including a nose portion and a tail portion; and
one or more slide structures or one or more linkages that are coupled to the foil and arranged to restrain movement of the foil when the foil is actuated by the one or more cranks via the one or more connecting structures, such that rotational motion of the shaft is translated to a combination of motion of the foil between an inner extent and an outer extent and motion of the foil within an angular range between a first limit and a second limit,
wherein a pitch angle of the foil is at a maximum inward pitch angle or a maximum outward pitch angle with respect to a direction of propulsion when the foil is disposed at a midpoint between the inner extent and the outer extent.

14. The propulsion device of claim 13, wherein the one or more slide structures or one or more linkages are one or more linkages.

15. The propulsion device of claim 13, wherein the one or more slide structures or one or more linkages are one or more slide structures.

16. The propulsion device of claim 15, wherein the foil is rigidly coupled to the one or more connecting structures via a mast, the mast extending through a channel of the one or more slide structures, the channel restraining movement of the mast and thereby the foil.

17. The propulsion device of claim 16, wherein the mast is oriented parallel to the leading edge of the foil.

18. A device for use with a fluid, comprising:
a shaft coupled to a drive system that rotates the shaft;
one or more cranks rigidly coupled to the shaft;
one or more connecting structures that are movably coupled to at least one of the one or more cranks, the movable coupling to permit rotation therebetween;
a foil rigidly coupled to the one or more connecting structures, the foil actuated by the one or more cranks via the one or more connecting structures, the foil including a nose portion and a tail portion; and
one or more slide structures or one or more linkages configured to guide the foil, such that rotational motion of the shaft is translated to a combination of motion of the foil between an inner extent and an outer extent and motion of the foil within an angular range between a first limit and a second limit, or the combination of motion of the foil between the inner extent and the outer extent and motion of the foil within the angular range between the first limit and the second limit is translated to rotational motion of the shaft.

19. The device of claim 18 wherein a pitch angle of the foil is at a maximum inward pitch angle or a maximum outward pitch angle when the foil is disposed at a midpoint between the inner extent and the outer extent.

20. The device of claim 18 wherein the one or more slide structures or one or more linkages is one or more slide structures.

* * * * *